May 19, 1942.  J. L. WILLIAMSON  2,283,661

DIFFERENTIAL DRIVING GEARING

Filed Nov. 20, 1940  3 Sheets-Sheet 1

Inventor
James L. Williamson
by Wright, Brown, Quinby & May
Attys.

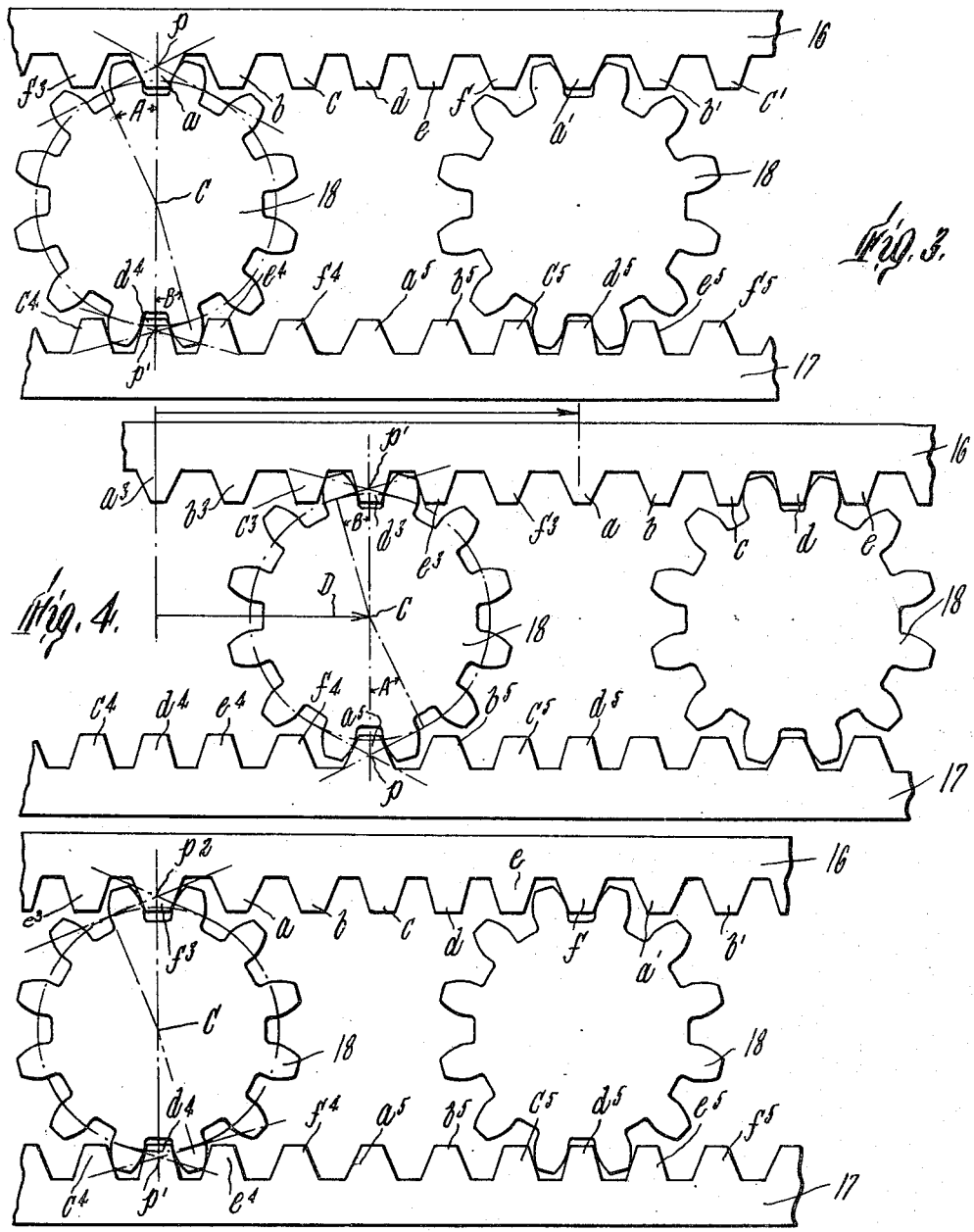

May 19, 1942.   J. L. WILLIAMSON   2,283,661
DIFFERENTIAL DRIVING GEARING
Filed Nov. 20, 1940    3 Sheets-Sheet 3

Inventor
James L. Williamson
by Wright, Brown, Quinby & May
Attys.

Patented May 19, 1942

2,283,661

UNITED STATES PATENT OFFICE 2,283,661

DIFFERENTIAL DRIVING GEARING

James L. Williamson, Springfield, Vt., assignor to The Fellows Gear Shaper Company, Springfield, Vt., a corporation of Vermont Application November 20, 1940, Serial No. 366,396

12 Claims. (Cl. 74—315)

The present invention relates to driving gearing of the differential type adapted to transmit rotation to a plurality of machine elements, such as shafts or wheels, at equal or unequal speeds. Such gearings are used in connection with the driving wheel axles of automobiles to transmit the propelling power while permitting a speed differential between the two driving road wheels in rounding curves and turning corners. The usual differential gear so used has the defect that, if one of the driving wheels bears on a slippery place where the traction is too poor to sustain the propelling thrust, it will cause such wheel to spin and allow the other to remain stationary. This condition occurs, for instance, when an attempt is made to start an automobile while one of its driving wheels rests on an icy or similarly slippery spot in the road while the other rests on a surface having a greater coefficient of friction. In such circumstances the power applied by the engine rotates only the wheel of which the traction is insufficient to prevent slipping and the car does not start.

Attempts have been made to overcome this drawback, including a bevel gear and pinion differential in which the planet pinions are mounted eccentrically and the bevel sun gears are made with a hill and dale formation complemental to the eccentricity of the pinions; the effect of which is to deliver a series of impulses to the stationary propelling road wheel while the other wheel is spinning on poor traction. Such impulses augment the tendency to rotate the stationary wheel and, when sufficiently frequent and powerful, cause the car to start.

My invention is an improvement on that above referred to and has the object of obtaining similar results by other means which have certain manufacturing and operative advantages hereinafter described. Two of the forms in which the invention may be embodied are illustrated in the drawings, in which Fig. 1 is a horizontal section of a differential gearing containing such embodiment, and in which the sun gears are face gears and the planet pinions are spur pinions;

Fig. 3 is a diagram showing two of the planet pinions and a development into one plane of the parts of the sun gear teeth intersected by a cylinder of which the traces are indicated at 3—3 in Figs. 1 and 2;

Fig. 4 is a diagram similar to Fig. 3 but illustrating the positions of the gears when one sun gear has been advanced through a quarter revolution beyond the other sun gear;

Fig. 5 is a diagram similar to Fig. 3 but illustrating a different manner of assemblage of the gears;

Like reference characters designate the same parts wherever they occur in all the figures.

Figure 1:
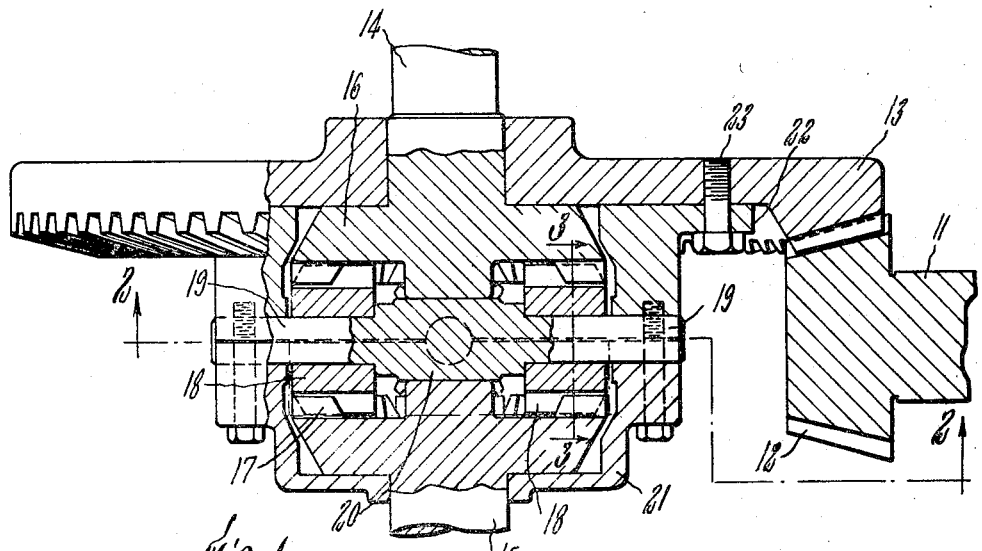

Assuming that the illustration here given is that of the rear axle driving gearing of an automobile, the character 11 represents the propeller shaft of the automobile which is driven by the engine through any suitable transmission means. A bevel pinion 12 on shaft 11 meshes with a bevel gear 13 which is mounted rotatably on shaft 14 which forms one of the alined sections of the rear axle to which the propelling road wheels of the automobile are secured. The other axle section is shown at 15. These axle sections carry gears 16 and 17, here shown as integral with them, but which may be otherwise rigidly secured to them. These gears are herein referred to as sun gears because they run in mesh with pinions having a planetary motion. Although the gears here shown are unlike those more commonly understood by the term "sun gears", in that they are neither surrounded by, nor surround, the orbit of their planet pinions, yet they are analogous in operation to such sun gears and may properly be so called for the purpose of defining the present invention. Planet pinions 18 are supported between and in mesh with the sun gears 16 and 17, being mounted to rotate about their geometrical axes on pivots 19 of a pinion carrier 20. Such pinion carrier is located between the contiguous ends of the axle sections with the pivots extending radially outward, all in the same plane midway between the sun gears, and the protruding ends of the pivots are held in a casing 21 which is secured to the bevel gear 13 and encloses the differential gear assemblage. As here shown, the casing 21 is made of two parts bolted together on the axial plane of the pinion pivots, and having a flange 22 which is secured by bolts 23 to the gear 13. The teeth of each sun gear are all in a surface of revolution about the axis of the gear, and those of each pinion are equally distant from the axis of the pinion.

The differential gearing thus illustrated differs from the usual rear end driving mechanism for automobiles in that, either—

(a) The teeth of either or both sun gears are spaced with repeated progressive elongations and contractions of circular pitch and all are conjugate to the planet pinions of uniform tooth spacing; or, alternatively, (b) The teeth of the planet pinions have varying angular spacing about their axes, while being conjugate to sun gear teeth of uniform spacing;

(c) Preferably, although not necessarily, the sun gears are face, or crown, gears and the planet pinions are spur gears.

Figure 2:
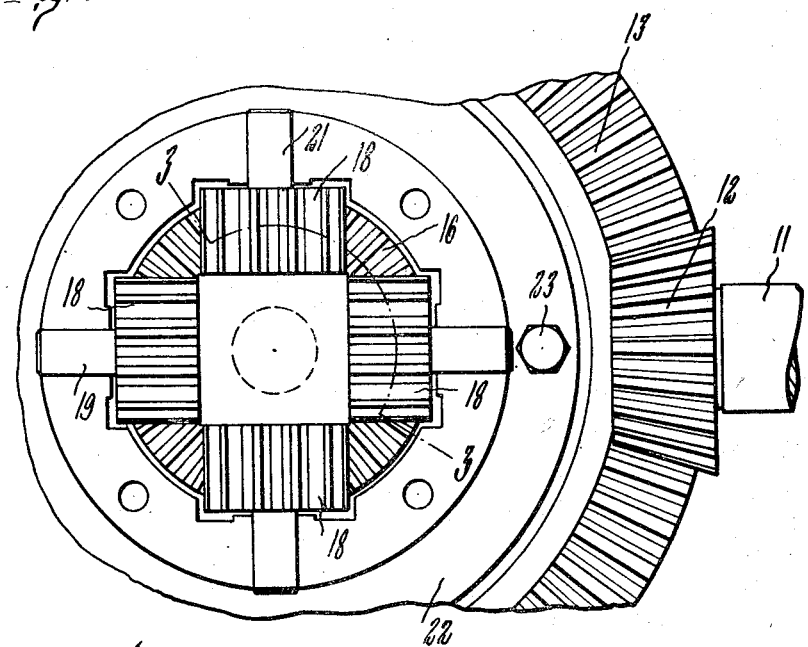
Fig. 2 is an elevation of the parts beyond the line 2—2 of Fig. 1 as viewed in the direction of the arrows on said line.

The condition described in paragraph a above is illustrated diagrammatically in Figs. 3–5, wherein the teeth of the face gears shown in Figs. 1 and 2, at their intersections with a co-axial cylinder, passing through line 3—3 of Figs. 1 and 2, near the inner ends of the teeth, are represented as developed into the plane of the drawings. Considering first the gear 16, its teeth are arranged in recurring groups or series $a$, $b$, $c$, $d$, $e$, $f$, $a'$, $b'$, $c'$, etc. to $f^3$, which is the last one of the circuit beginning with $a$ and extending from left to right. The pitch spacing is at the widest between tooth $a$ and teeth $f^3$ and $b$ at either side. It diminishes from $b$ to $c$, and from $c$ to $d$, by successive contractions, and then elongates from $d$ to $e$, $e$ to $f$ and $f$ to $a'$. From $a'$ to $b'$ to $c'$ to $d'$ the spacing diminishes again; and this cycle of diminishing and increasing pitch distances is repeated throughout the circuit of the gear. There may be any number of teeth in one group or cycle of the character described, and a single one, or any larger number, of such groups in the gear; subject to practical limitations of the spaces in which the gears are to be installed and the necessary strength of the teeth. In this illustration there are four complete groups or series of teeth with variations of spacing as defined. Of course, all groups must have the same number of teeth. The whole number of teeth of the gear, therefore, is an integral multiple (from one upward) of the number in one group.

The teeth of the planet gears or pinions 18 are all alike, all equidistant from the axes of the respective pinions and equally spaced around such axes. Such teeth, and those of the sun gear are mutually conjugate. Thus the sun gear teeth, owing to their variable spacing, differ from one another in pressure angle; those of wider spacing having relatively large pressure angles and included angles between their side faces, and those of narrower spacing having relatively small pressure angles and included angles.

The teeth of sun gear 17 are like those of gear 16, and are designated in the diagrams by the same reference letters modified by appropriate exponents. All teeth designated by the same reference letters, disregarding exponents, are alike in both gears and in all recurring groups of teeth in each gear.

The sun gears are assembled with the planet pinions in such manner that teeth of wider spacing of one sun gear will come into full mesh with the pinions when teeth of narrower spacing of the other sun gear mesh with the pinions at the diametrically opposite side of the latter. In most cases, although not universally, the teeth of widest spacing and largest included angle of one gear are placed opposite those with the narrowest spacing of the other gear. This is the condition illustrated in Figs. 3 and 4.

In Fig. 3 the teeth $a$, $a'$, $a^2$, etc. of gear 16, which are the teeth of maximum angle between their side faces, mesh with the planet pinions diametrically opposite to the teeth $d^4$, $d^5$, $d^6$, etc., the teeth of the gear 17 which have the minimum included angle. The active pressure angle between the pinion and the gear 16 is shown at A and is a maximum, while that between the pinion and the gear 17 is shown at B and is a minimum. The effective pitch point of the pinion with gear 16, designated $p$, is at this time more distant from the axis C of the pinion than is the effective pitch point $p'$ of the pinion with the gear 17. Thus, if it be assumed that the pinion acts as a driver turning about a stationary axis, while the sun gears are free to rotate, the pinion tends to drive the gear 16 at maximum angular velocity and the gear 17 at minimum angular velocity. But the effective leverage (pitch radius) constantly varies, increasing and diminishing, with respect to the gear 17, while it diminishes and then increases with respect to the gear 16, between values equal to $Cp$ and $Cp'$ as to each gear.

The effect produced by such varying leverage when one road wheel slips by reason of poor traction and the other is held stationary by good traction is this: The planet pinions roll on the stationary sun gear and rotate the other sun gear with varying angular velocity. Assuming that the gear 17 is stationary and that the pinions roll with uniform translative velocity in the direction of the arrow D shown in Fig. 4, then the pinion 18 in rolling from full mesh with tooth $d^4$ to full mesh with tooth $a^5$, advances the gear 16 until the tooth $d^3$ of that gear comes into full mesh with it. During this period the effective pitch radius of the pinion with respect to gear 17 is lengthening, until it becomes equal to $Cp$, and that with respect to gear 16 is shortening to the length $Cp'$, whereby rotation of the pinion about its own axis is relatively retarded, and rotation of sun gear 16 is further retarded. In the further travel in the same direction, until the pinion meshes with the teeth $d^1$ and $a^3$, its pitch radius with respect to gear 17 becomes longer and that with respect to gear 16 shorter, and the rotational speed of gear 16 is accelerated. The other pinions coact in like manner with other similar teeth of the sun gears. Thus the spinning wheel is advanced with repeated relative retardations and accelerations. If the planet pinions are revolved in their orbit with acceleration enough to cancel the retardation of rotation about their own axes, the net result is a succession of accelerations of the spinning wheel. These are repeated as many times in each revolution of the pinions as the number of recurring groups or cycles of teeth in the sun gears. The accelerating impulses are delivered against the mass and inertia of the spinning wheel, the reaction of which, transmitted through the pinions, causes forward driving impulses to be applied to the stationary wheel. The latter impulses are added to the tractive effort of the spinning wheel, with propelling effect on the vehicle. The frequency and power of such propelling impulses increase in proportion to increase in the speed of the engine.

It should be noted that the invention is not limited to the principle of variable tooth spacing in both sun gears, but that it embraces the condition in which the teeth of only one sun gear are thus variably spaced while those of the other are uniformly spaced. With the latter arrangement, results the same in kind are obtained as with that where both sun gears have variably spaced teeth, although the intensity, or degree, of the impulses delivered to the spinning gear is less.

One of the advantages of the new combination herein described is that the number of planet pinions is independent of the gear ratio between face gears and pinions. The present illustration shows four pinions with a two to one ratio. But there may be any number of pinions, from one up to the number of sets or cycles of recurring teeth in the sun gears. The four pinions of the illustrative embodiment are set 90° apart around the axis of the sun gears. But there might be only one pinion; or two pinions spaced either 180° apart, or 90° apart in one direction around the sun gear axis and 270° in the opposite direction; or three pinions of which two are opposite to one another and the third is spaced 90° from each of the other two. In general it may be said that the angular disposition of corresponding teeth in the several sets or cycles of teeth of the sun gears is equal to 360° divided by the number of such sets; and that the angular spacing of the pinions around the axis of the sun gears is equal to the angle so determined, or an integral multiple of that angle.

The ability to use a relatively large number of pinions in a small gear ratio enables the pulsating effect previously described to be obtained with a good distribution and balancing of forces without making the assemblage unduly large.

Another advantage is that the sun gears may be assembled in any position, except exact opposition of like teeth of the sun-gears diametrically across the pinions, without causing any difficulty or sacrificing more than a portion of the desired impulse effect. This is made clear by Fig. 5, in which the pinions are related to the gear 17 in the same manner as represented in Fig. 3, but the gear 16 is set over to the right by the distance of one tooth from the position shown in Fig. 3. Although the pitch radius $Cp^2$ with respect to gear 16 is shorter than the pitch radius $Cp$, it is longer than the pitch radius $Cp'$; and throughout the cycle of operations there are differences of pitch radii between the pinions and the two gears of the same character as that previously described, but of less degree. Such an arrangement may be desirable at times in order to soften the shocks due to recurring impulses applied to a spinning wheel.

The same effects are obtainable by a reversal of the arrangement previously described, in which the teeth of the pinion or pinions are variably spaced while the teeth of the sun gears are equally spaced and are identical with one another as to form and pressure angle. Such an alternative embodiment is diagrammatically illustrated in Figs. 6 and 7, where the sun gears are designated 16L and 17I, and one of the planet pinions is shown and designated 18I. The pinion rotates about its geometrical axis C, which is located midway between the sun gears, as in the previous illustration, but the teeth of the pinion are spaced with variable angular spacing about the axis C while being equidistant therefrom. Between teeth $t'$ and $t^2$ is the smallest angle; between $t^2$ and $t^4$ a larger angle, which is equal to that between $t'$ and $t^3$; between $t^4$ and $t^6$ a still larger angle; and the angles between successive teeth are progressively larger, until the largest angle occurs between teeth $t^9$ and $t^{10}$. Between $t^9$ and $t^7$ the angle is equal to that between $t^{10}$ and $t^8$; between $t^7$ and $t^5$ the angle is equal to that between $t^8$ and $t^6$; and that between $t^5$ and $t^3$ is equal to that between $t^6$ and $t^4$. Thus, proceeding either way around the axis C from the smallest angle, there is a progressive increase of tooth spacing to the opposite side of the pinion, and then a progressive decrease to the starting point. The angles referred to are those between the median radial lines of the teeth, designated by dot and dash lines in the drawings.

The thickness of the different teeth and their face curves are established in proper ratio to the angular spacing so as to cause coaction of the pinion teeth with the face gear teeth on lines of action all having the same inclination but crossing the sun gear teeth at different points between the roots and crests of the latter. The lines of action between the pinion teeth $t'$ and $t^2$, and any tooth of either sun gear, are shown at $l'a'$ and $l^2a^2$ respectively. The corresponding lines of action of the teeth $t^9$ and $t^{10}$ are shown at $l^9a^9$ and $l^{10}a^{10}$ respectively. All lines of action have the same inclination with respect to a plane perpendicular to the axis of the sun gears. It follows from these conditions that the pitch radius $Cp$ between either tooth $t'$ or $t^2$ and a sun gear tooth embraced between them is longer than the pitch radius $Cp'$ on which the contiguous faces of the teeth $t^9$ and $t^{10}$ coact with a sun gear tooth. With respect to faces of the pinion teeth flanking other spaces, the lines of action and pitch points are at progressively varying distances from the axis C between the limits designated by the lines and points here shown.

Figure 6:
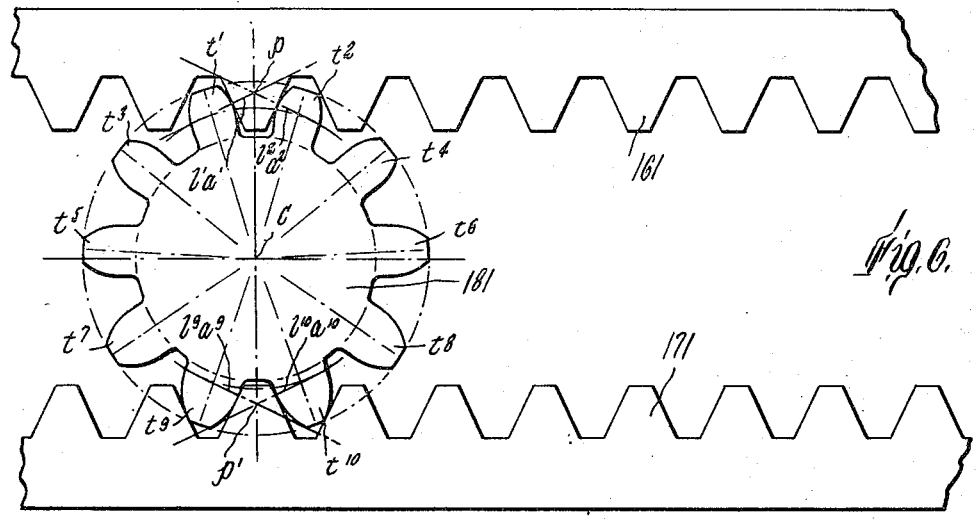
Figs. 6 and 7 are diagrams showing the principles of the invention in a different, but equivalent, embodiment.
Figure 7:
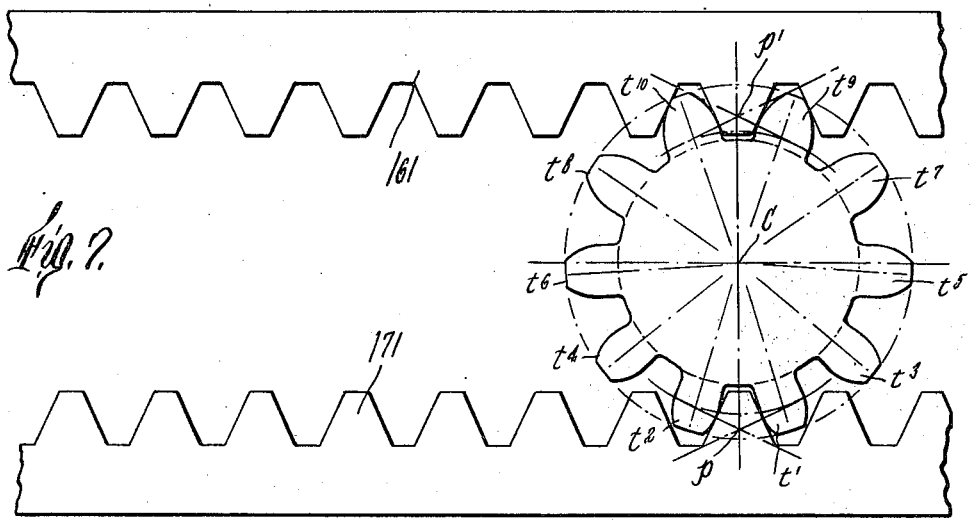

Thus if the gear 17I be considered as stationary and gear 16I free to rotate, while the pinion is carried in a planetary path, then, in rolling from the position shown in Fig. 6 to that shown in Fig. 7, the pinion will coact with the stationary sun gear 17I on progressively lengthening pitch radii, and with the spinning sun gear on progressively diminishing radii. During the further progression until a relationship like that shown in Fig. 6 is reached, an acceleration is imparted to the spinning sun gear. Thus the effect is the same as in the case precedently described.

In the second case there is no limit, except space and strength limitations, to the number of planet pinions which can be used in the assemblage, or to the gear ratio and number of teeth of sun and planet gears. Nor is there any limitation as to angular spacing of the pinions around the axis of the sun gears. It is only necessary that corresponding teeth of all the pinions be meshed with the sun gears at the same time. The sun gears may be assembled in any position of angular rotation about their axis with respect to the pinions, since all of their teeth are alike.

Figure 8:
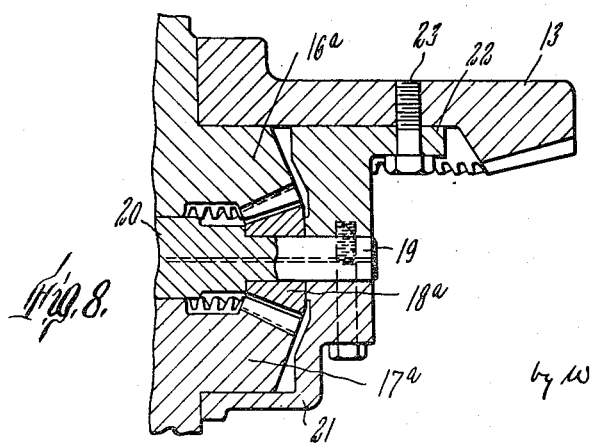
Fig. 8 is a fragmentary sectional view of a differential gearing having bevel gears embodying the same principles.

The principles and advantages of this invention are not conditioned on the use of face gears and spur pinions only. Tapered or bevel gears and pinions are within the scope of the invention, and so also are gears of any of the categories referred to having helical teeth, and including face gears having teeth conjugate to helical or spiral pinion teeth, whether the planet gear axes are radial to the sun gear axis or offset therefrom. As illustrative of this scope of the invention I have shown in Fig. 8 a fragment of an assemblage like that shown in Fig. 1, but differing only in that the sun gears 16a and 17a are bevel gears and the planet pinions 18a are likewise beveled. This latter illustration typifies tapered gears also, i. e. those which are generated by a gear shaper cutter reciprocating on an axis inclined to the axis of the pinion, and complementally inclined to the axis of the sun gears. All such gears and pinions within the purview of this invention have the characteristics of variable tooth spacing of either one or both sun gears, or of the planet pinions, as herein described.

I desire further to make it understood that nothing in the foregoing description is to be construed as limiting the use of the invention to the rear end drive gearing for an automobile or as excluding any other uses to which it may be applied; except as to such claims as may be definitely limited by their context to a specific use.

What I claim and desire to secure by Letters Patent is:

1. A differential gearing comprising sun gears, each having teeth on one face, mounted coaxially and rotatably with their toothed faces opposite to, and spaced apart from, one another, and a planet pinion supported to rotate about its geometrical axis and to revolve about the axis of the sun gears between, and in mesh with the teeth of, both said sun gears, the teeth of said gears and pinion being relatively unequally spaced with progressively increasing and decreasing spacing so as to cause alternate accelerations and decelerations of the sun gears when the planet pinion is held in one location and rotated at uniform speed about its own axis as a driver.

2. A differential gearing for applying recurrent impulses to a rotatable part of the gearing when another part is withheld from rotation, comprising two sun gears mounted rotatably face to face with a space between them, a planet gear mounted in said space to revolve about the axes of the sun gears and to rotate about its own axis, and means for so revolving said planet gear; said planet and sun gears having conjugate intermeshing teeth, of which the teeth of one of said gears are equally spaced on a circle coaxial with that gear, and the teeth of the intermeshing gear are variably spaced on a circle coaxial with such intermeshing gear, with progressively increasing and then progressively decreasing distances between successive teeth.

3. A differential gearing consisting of coaxial opposed sun gears and a planet pinion between and in mesh with said sun gears supported to revolve around the axis thereof, in which the teeth of the sun gears are variably spaced while being conjugate to the planet pinion, or vice versa, such variable spacing comprising progressive increases of distance between successive teeth followed by progressive decreases of distance between a further succession of teeth.

4. A differential gearing for transmitting torque to two rotatable members and applying recurrent impulses to one of said members when the other is withheld from rotation, comprising two sun gears mounted rotatably face to face with a space between them, each provided with teeth on the face thereof which is turned toward the other sun gear, a planet pinion mounted in said space and having peripheral teeth conjugate to and in mesh with the teeth of said sun gears, a carrier on which said planet gear is mounted to rotate about an axis coaxial with its peripheral teeth, said carrier being mounted to rotate about the axes of the sun gears, and means for rotating the planet gear carrier about said axis and thereby revolving the planet gear, the teeth of one of said sun gears being variably spaced with progressive increases of distance between successive teeth followed by progressive decreases of distance between a further succession of teeth.

5. A differential driving gearing comprising sun gears coaxially mounted for rotation with a space between them and having teeth on their contiguous faces, a pinion carrier mounted to rotate around the axis of said sun gears, means for imparting rotation to said pinion carrier, and a planet pinion mounted rotatably on said pinion carrier with its teeth in mesh with both sun gears, the teeth of said planet pinion being at equal distances from the axis of the pinion and the teeth of the sun gears being spaced with progressive increases and decreases of circular pitch, in a manner to cause alternate relative accelerations and retardations of either sun gear when the other sun gear is held stationary and the pinion is carried planetwise at constant speed around the axis of the sun gears.

6. A differential gearing comprising two sun gears each having teeth on one face mounted coaxially and rotatably with their toothed faces opposite to, and spaced apart from, one another, a planet gear having peripheral teeth equidistant from its axis, and means supporting said planet gear in mesh with both sun gears to rotate about its own axis and revolve about the axis of the sun gears, the teeth of said planet gear being unequally spaced around the axis thereof with progressive increases of angular spacing as to a succession of teeth and progressive decreases of such spacing as to a further succession of teeth; and the teeth of the sun gears being equally spaced on a circle coaxial with the sun gears.

7. A differential gearing comprising sun gears each having teeth on an end face rotatably mounted with their axes in alinement and their toothed faces toward one another with a space between them, a pinion carrier mounted to rotate about the axis of said gears, a plurality of planet pinions mounted on said carrier in positions enabling them to travel in an orbit around said axis when the carrier is rotated, and to rotate about their respective axes transverse to such orbit, and means for rotating said carrier; the teeth of the several pinions being equidistant from and spaced equiangularly around their respective axes and the teeth of the face gears being conjugate to those of the pinions and being arranged in a plurality of groups, each containing the same number of teeth and in which the teeth are spaced with symmetrical and progressive increases and decreases of distance between them; the angular disposition of the planet pinions around the axis of the face gears being equal to the angle between corresponding teeth of successive groups of the face gear teeth, or a multiple of such angle.

8. A differential gearing comprising two sun gears, each having teeth disposed on an end face, rotatably mounted with their axes in line and their toothed faces turned toward one another and spaced apart, a pinion carrier mounted to rotate about the axis of said gears between them, planet pinions rotatably mounted on said carrier with their geometrical axes substantially radial to the before named axis and in a location between the sun gears such that their teeth mesh simultaneously with the teeth of both sun gears; the teeth of said pinions being all at the same distance from their respective axes and spaced apart with equal angular spacing, and the teeth of the sun gears having varying spacings such that when one of the sun gears is prevented from rotation while the other is free to rotate, and the pinions are caused to roll about the sun gear axis, a variable speed of rotation is imparted to the free sun gear.

9. A differential gearing comprising two sun gears, each having teeth disposed on an end face in a plane perpendicular to its axis, rotatably mounted with their axes in line and their toothed faces turned toward one another and spaced apart, a pinion carrier mounted to rotate about the axis of said gears, cylindrical planet pinions rotatably mounted on said carrier with their geometrical axes substantially radial to the before named axis and in a location between the sun gears such that their teeth mesh simultaneously with the teeth of both sun gears; the teeth of said pinions being all at the same distance from their respective axes and spaced apart with equal pitch spacing, and the sun gear teeth being variably spaced with alternate progressive increases and decreases of pitch spacing.

10. A differential gearing comprising two sun gears, each having teeth disposed on an end face in a plane perpendicular to its axis, rotatably mounted with their axes in line and their toothed faces turned toward one another and spaced apart, a pinion carrier mounted to rotate about the axis of said gears, cylindrical planet pinions rotatably mounted on said carrier with their geometrical axes substantially radial to the before named axis and in a location between the sun gears such that their teeth mesh simultaneously with the teeth of both sun gears; the teeth of said pinions being all at the same distance from their respective axes and spaced apart with equal pitch spacing, and the teeth of the sun gears being arranged in a number of groups, in each of which the pitch spacing progressively increases and progressively decreases from one end to the other of the series, all of said teeth being conjugate to the pinion teeth, and the increases and decreases of pitch spacing being alike in all of said series, and the pinions being disposed with an angular spacing around the axis of the sun gears such that the several pinions are, at any one time, in mesh with corresponding ones of the teeth in the different groups of the sun gears.

11. A differential gearing comprising two sun gears, each having teeth disposed on an end face with uniform spacing between them on a circle concentric with its axis, said gears being mounted rotatably with their axes in alinement and their toothed faces turned toward one another with a space between them, a pinion carrier mounted to rotate about the axes of said gears, planet pinions supported rotatably by said carrier between and in mesh with the sun gears, the teeth of said planet pinions being equidistant from their respective axes, but spaced unequally around such axes with progressively increasing distances as to a succession of teeth and progresively decreasing distances as to the next following succession of teeth, and all of said pinion teeth being conjugate to the sun gear teeth.

12. A differential gearing comprising sun gears, each having teeth on an end face, mounted coaxially and rotatably with their toothed faces turned toward, and spaced apart from, each other, a planet pinion between and in mesh with both sun gears, and means for revolving said pinion as a driver in an orbit surrounding the sun gear axis; the teeth of sun gears and pinion being relatively unequally spaced with progressively increasing and diminishing spacing such as to cause alternate accelerations and decelerations of one sun gear when the pinion is revolved at uniform speed in its orbit and the other sun gear is withheld from rotation.

JAMES L. WILLIAMSON.